United States Patent
Otterstedt

(10) Patent No.: US 8,992,635 B2
(45) Date of Patent: Mar. 31, 2015

(54) DISTORTION-FREE SCREEN-PRINTED ANODES ON TA/NB SHEET

(71) Applicant: H.C. Starck GmbH, Goslar (DE)

(72) Inventor: Ralph Otterstedt, Goslar (DE)

(73) Assignee: H. C. Starck GmbH, Goslar (DE)

( * ) Notice: Subject to any disclaimer, the term of this patent is extended or adjusted under 35 U.S.C. 154(b) by 0 days.

(21) Appl. No.: 14/351,144

(22) PCT Filed: Oct. 25, 2012

(86) PCT No.: PCT/EP2012/071132
§ 371 (c)(1),
(2) Date: Apr. 11, 2014

(87) PCT Pub. No.: WO2013/060768
PCT Pub. Date: May 2, 2013

(65) Prior Publication Data
US 2014/0285952 A1    Sep. 25, 2014

(30) Foreign Application Priority Data
Oct. 26, 2011  (DE) .......................... 10 2011 116 939

(51) Int. Cl.
*H01G 9/032* (2006.01)
*H01G 9/052* (2006.01)
*H01G 9/042* (2006.01)
*H01G 9/00* (2006.01)

(52) U.S. Cl.
CPC ............. *H01G 9/042* (2013.01); *H01G 9/0029* (2013.01); *H01G 9/0525* (2013.01); *H01G 9/0036* (2013.01)

USPC .......... 29/25.03; 29/25.42; 361/528; 361/529

(58) Field of Classification Search
USPC ........ 29/25.03, 25.42; 361/313, 321.2, 321.4, 361/322, 528, 529
See application file for complete search history.

(56) References Cited

U.S. PATENT DOCUMENTS

| | | |
|---|---|---|
| 2,917,419 A | 12/1959 | Robinson |
| 4,910,645 A * | 3/1990 | Jonas et al. .................... 361/525 |
| 6,510,044 B1 | 1/2003 | Löffelholz et al. |
| 6,795,299 B2 * | 9/2004 | Naito ............................ 361/509 |
| 2004/0136857 A1 | 7/2004 | Clasen et al. |
| 2004/0226630 A1 | 11/2004 | Koenitzer et al. |

FOREIGN PATENT DOCUMENTS

| | | |
|---|---|---|
| EP | 1 114 430 B1 | 7/2001 |
| EP | 1 208 573 B1 | 5/2002 |
| WO | WO 00/16353 A1 | 3/2000 |

* cited by examiner

*Primary Examiner* — Evan Pert
(74) *Attorney, Agent, or Firm* — Norman B. Thot

(57) ABSTRACT

A process for producing anodes includes providing a foil comprising tantalum or niobium. A surface of the foil is oxidized so as to form oxides on the foil surface. The foil is heated so that the oxides formed on the foil surface diffuse into the foil. A paste comprising a powder selected from the group consisting of a tantalum powder, a niobium powder, a niobium oxide powder and mixtures thereof is applied to the foil. The foil with the applied paste is sintered.

19 Claims, No Drawings

DISTORTION-FREE SCREEN-PRINTED ANODES ON TA/NB SHEET

CROSS REFERENCE TO PRIOR APPLICATIONS

This application is a U.S. National Phase application under 35 U.S.C. §371 of International Application No. PCT/EP2012/071132, filed on Oct. 25, 2012 and which claims benefit to German Patent Application No. 10 2011 116 939.7, filed on Oct. 26, 2011. The International Application was published in German on May 2, 2013 as WO 2013/060768 A2 under PCT Article 21(2).

FIELD

The present invention relates to the field of production of anodes. The present invention in particular relates to a process for producing distortion-free anodes by means of screen or stencil printing on thin tantalum or niobium foils. The present invention further relates to anodes which can be obtained by the process of the present invention.

BACKGROUND

Tantalum-solid electrolyte capacitors can, for example, be used in portable applications such as mobile telephones, laptops, palmtops, camcorders and the like in part because of their energy storage density. The main constituents of these Ta-solid electrolyte capacitors are Ta anodes. Increasingly thinner portable electronic devices are desired despite an increasing integration density of the components. Such anodes are usually produced by pressing Ta oxide and/or niobium oxide powder onto thin Ta sheets, followed by sintering. This conventional pressing-on of Ta powder does not, however, allow large aspect ratios to be produced, i.e., anodes for flat Ta capacitors having a low construction height cannot be produced in this way.

Tantalum anodes produced by printing of a Ta paste onto a Ta foil as substrate and subsequent binder removal/sintering often display severe distortion of the Ta substrate after sintering. The anode is then no longer flat and firstly cannot be processed as well and, secondly, the effective height of the anode is greater than when no distortion has occurred, i.e., volume which could be occupied by active composition is not used. Relatively high-capacitance tantalum powders and NbO powders, in particular, promote distortion and thin Ta foils, in particular, experience particularly severe distortion. Thicker Ta foils or sheets having a thickness of more than 100 microns are therefore used according to the prior art. A consequence of this is that stencil-printed anodes have an unfavorable ratio (sintered anode body) to passive Ta composition (Ta sheet substrate) and therefore have higher materials costs compared to pressed anodes.

SUMMARY

An aspect of the present invention is to provide a process for producing anodes based on a high-capacitance powder on a thin Ta or Nb foil and anodes which can be obtained by this process, with the anodes having reduced deformation (distortion).

In an embodiment, the present invention provides a process for producing anodes which includes providing a foil comprising tantalum or niobium. A surface of the foil is oxidized so as to form oxides on the foil surface. The foil is heated so that the oxides formed on the foil surface diffuse into the foil. A paste comprising a powder selected from the group consisting of a tantalum powder, a niobium powder, a niobium oxide powder and mixtures thereof is applied to the foil. The foil with the applied paste is sintered.

DETAILED DESCRIPTION

The present invention accordingly provides a process for producing anodes, which comprises the steps:

a) oxidation of the surface of a foil comprising tantalum or niobium;

b) heating the foil to allow the oxides formed on the surface to diffuse in;

c) application of a paste comprising powder selected from the group consisting of tantalum powder, niobium powder, niobium oxide powder and mixtures thereof; and d) sintering of the applied paste.

Step b) of the process of the present invention relates to diffusion of the oxides formed at the surface in step a) into the foil by heating the foil. Without wishing to be tied to the theory, it is assumed that diffusion of the oxide layer formed on the surface into the foil leads to a type of pre-expansion of the foil by incorporation of interstitial oxygen. This has the result that, owing to the pre-expansion of the foil, the sintering step occurring in step d) is associated with lower distortion.

The conditions for the diffusion of the oxides formed on the surface as a result of heating the foil can be achieved by a suitable choice of temperature and time. It can be advantageous, however, to carry out step b) under reduced pressure or alternatively under an inert gas atmosphere in order to substantially avoid a complete oxidation or a further oxidation of the foil.

The present invention further provides a process for producing anodes, which comprises the steps:

a) oxidation of the surface of a foil comprising tantalum or niobium;

b) heating the foil which has been oxidized on the surface to a temperature above 600° C., for example, for a time of at least 10 minutes;

c) application of a paste comprising powder selected from the group consisting of tantalum powder, niobium powder, niobium oxide powder and mixtures thereof; and d) sintering of the applied paste.

The process according to the present invention is particularly suitable for the use of very thin foils which comprise tantalum or niobium or consist essentially of tantalum or niobium. In an embodiment, the foil can, for example, have an average thickness below 100 µm, for example, below 60 µm, for example, in the range from 10 to 50 µm, for example, from 15 to <30 µm.

According to the present invention, the foil can have a length to width ratio of from 3:1 to 10:1 or more, with a subarea of from 0.5 to 100 mm$^2$, for example, from 2 to 40 mm$^2$, of the foil being provided on one or both sides with the sintered body.

The anodes which can be obtained by the process of the present invention are, for example, suitable for electrolytic capacitors which have a sheet-like shape, i.e., their geometric extension in two dimensions is greater than that in the third dimension.

The anodes of the present invention can, for example, be configured so that the foil projects beyond the sintered body in at least one direction. This achieves heat removal which is improved further and simplifies electrical contacting.

A number of techniques are in principle suitable for the deliberate oxidation of the surface of the foil in step a) of the process of the present invention. In an embodiment of the process of the present invention, oxidation of the foil surface can, for example, be effected by means of a process selected from among thermal oxidation, anodic oxidation, chemical oxidation and application of tantalum (V) oxide or NbO by printing, heat treatment, sputtering, physical vapor deposition (PVD) or chemical vapor deposition (CVD).

When the oxide layer is applied in step a) by printing, heat treatment, sputtering, PVD or CVD, the Ta foil can be coated from one side or from both sides. Application of a Ta oxide layer by printing of a Ta oxide powder having a particle size of 400 mesh in paste form in a thickness of up to 5 microns can, for example, be carried out.

Anodic oxidation can, for example, be used in step a). In an embodiment of the present invention, an oxide layer can, for example, be applied in a manner known to those skilled in the art by means of anodic oxidation adapted for Ta sheets or Ta foils of this thickness.

The oxidation of the surface of the foil can, for example, be carried out by thermal oxidation at a temperature of from 300 to 800° C., for example, from 350 to 600° C., for example, 380 to 550° C. The thermal oxidation of the surface of the foil is usually carried out for a time of from 10 to 120 minutes.

Step b) of the process of the present invention can, for example, be carried out at a temperature above 600° C., for example, from 700 to 2,000° C., for example, from 750 to 1,600° C. and, for example, from 900 to 1,300° C.

The duration of the thermal treatment depends on the average thickness of the foil. The thermal treatment in step b) of the process of the present invention is usually carried out for a time of at least 10 minutes, for example, from 10 to 240 minutes, for example, from 20 to 120 minutes.

To avoid further oxidation of the foils, it can be advantageous to carry out step b) under a reduced pressure or alternatively under an inert gas atmosphere which can, for example, comprise noble gases and is essentially free of oxygen (especially less than 10% by volume of oxygen, for example, less than 5% by volume, for example, less than 2% by volume of oxygen).

In an embodiment, the thermal treatment in step b) of the process of the present invention can, for example, be carried out at a gas pressure below $10^{-2}$ bar, for example, below $10^{-4}$ bar and, for example, below $10^{-6}$ bar.

The application of the paste in step c) of the process of the present invention can furthermore be carried out, for example, by means of screen printing and, for example, by means of stencil printing.

The paste can, for example, here comprise from 40 to 92% of tantalum or niobium or niobium monoxide (niobium suboxide) as a discrete phase and a continuous phase which comprises essentially only organic compounds made up of carbon, hydrogen and oxygen atoms, where the ratio of oxygen to carbon atoms is at least 0.5, and optionally a solvent which vaporizes at below 150° C. The percentage of niobium, niobium monoxide, or tantalum can, for example, be from 50 to 90% by weight, based on the total weight of the paste.

Compounds which are liquid at room temperature can, for example, be used as organic compounds. The continuous phase can in this case, for example, be otherwise solvent-free. Suitable liquid organic compounds are ethylene glycol, diethylene glycol, triethylene glycol and tetraethylene glycol and also esters thereof, glycerol, glyceryl monoacetate, glyceryl diacetate, glyceryl triacetate, dioxyacetone, propanediol or mixtures thereof. The continuous phase can additionally contain an organic binder system. The binder should be used in amounts of not more than 5% by weight, based on the continuous phase. A binder system can, for example, consist of Natrosol Plus 331 from Hercules or an acrylic polymer, for example, Rohagit KF 720 from Rohm, or a hydroxypropylcellulose. To achieve better wetting of the metal powder, wetting agents such as soya lecithin from Langer and/or Surfinols from Biesterfeld can, for example, be used. If the binder is used only in minor amounts, the ratio of oxygen atoms to carbon atoms in the continuous phase is essentially unaffected. The phosphorus introduced into the continuous phase with the soya lecithin and the nitrogen cause no harm since phosphorus and nitrogen are among the usual doping substances for tantalum powders or niobium powders which can be used for capacitors.

The binder system can, for example, be adjusted so that the viscosity of the paste is in the range 150-500 Pa s (at a shear rate of 1 $s^{-1}$) and in the range 20-75 Pa s (at a shear rate of 10 $s^{-1}$) measured by means of a Gemini 200 HR NANO rotational viscometer from Bohlin using a cone)(4°)-and-plate system (20 mm diameter) at 25° C. In an embodiment of the present invention, the organic compound can, for example, also be a solid substance. Suitable organic compounds which are solid at room temperature are erythritol, pentaerythritol, pentitols, aldoses or ketoses having from 3 to 6 carbon atoms or mixtures thereof. Sugars or sugar-like compounds are also suitable. Solid organic compounds are used in combination with a solvent, which solvent should vaporize at temperatures of up to 150° C. Suitable solvents are, for example, water, ethanol, propanol and short-chain glycols.

The above-mentioned liquid organic compounds are also suitable as solvents, as long as the solid organic compounds are sufficiently soluble therein. The solid organic compounds can accordingly be used as thickeners when liquid organic compounds are used as main component of the continuous phase.

Pastes which can advantageously be used for the purposes of the present invention are, for example, described in WO 00/16353 A1.

For the purposes of the present invention, screen printing is an operation known to those skilled in the art in which the above-described paste is applied by means of a printing squeegee through a screen, typically having a mesh opening in the range from 20 to 100 μm, to the Ta foil. In a first phase, the mesh of the screen is filled with the paste by means of a filling squeegee. In a subsequent second phase, a printing squeegee produces linear contact with the Ta foil, with the pressure under which the paste is compressed in the mesh of the screen being determined by the blade angle together with the blade speed, the geometry of the screen and the paste consistency. The compressed Ta/Nb paste thus penetrates through the mesh of the screen in front of the blade edge and is held by adhesion forces on the Ta foil. The paste adhering to the Ta foil is subsequently released from the mesh of the screen.

In an embodiment, the screen is replaced by a stencil in the stencil printing process which is likewise known to those skilled in the art.

In an embodiment, the paste in step c) can, for example, comprise a tantalum powder. A Ta powder having a capacitance of from 15,000 to 300,000 μFV/g can, for example, be used.

Suitable powders which can be used for the paste are, for example, obtainable under the trade names STA200KA, STA150K, STA100K, STA70KA, STA50KF, NbO80K and the like from H. C. Starck (Goslar, Germany).

In an embodiment of the present invention, the process comprises the following steps:

a) oxidation of the surface of a foil comprising tantalum, where the average thickness of the foil is below 60 μm, by thermal oxidation at from 300 to 800° C.;

b) heating the foil which has been oxidized on the surface to a temperature from 900 to 1,600° C. and a pressure below $10^{-2}$ bar;

c) application of a paste comprising tantalum powder, for example, a paste comprising from 50 to 90% by weight of tantalum powder, by stencil printing or screen printing;

d) sintering of the applied paste; and e) optionally parting of the anodes.

The separation (parting) of the individual anodes in step e) is carried out by methods known to those skilled in the art, for example, by sawing using a wafer saw, laser parting using a pulsed fiber laser.

Production of ultra-flat, distortion-free anodes by the process of the present invention can therefore comprise a) surface oxidation of a Ta foil having a thickness of 25-50 microns and dimensions of 10×10 cm$^2$ by thermal oxidation at from 300 to 800 C for from 10 to 120 minutes, b) subsequent heating at 1,100° C. under reduced pressure, c) application of a Ta paste having a Ta content of 80-90% by weight in a thickness in the range from 35 to 150 microns by means of stencil printing to not more than 85% of the Ta foil surface, drying and subsequent d) sintering of the anodes and e) final separation of the individual anodes.

The present invention further provides an anode which can be obtained by the process of the present invention. In an embodiment of the anode of the present invention, the anode can, for example, have a horizontal dimension of from 1 to 10 mm and a vertical dimension of from 25 to 250 microns.

The present invention further provides for the use of the anodes of the present invention for solid-electrolyte capacitors and electronic components, in particular, for capacitors in portable devices such as mobile telecommunications devices, laptops, palmtops and camcorders.

Sintering of the paste or the foils to which the paste has been applied is carried out under the conditions with which a person skilled in the art will be familiar, for example, at temperatures in the range from 800 to 1,500° C.

EXAMPLES

Eight tantalum foils having an average thickness of 50 μm and a size of 5 cm×5 cm were in each case employed for test purposes.

Example 1

The foils having dimensions of 8 cm×5 cm were oxidized on the surface by means of anodic oxidation. The oxide layer was obtained by treatment at 125 V for 3 hours at a very low current. The oxide layer thickness was subsequently measured as 95 nm and the foils were cut to a size of 5 cm×5 cm.

Example 2

The foils having dimensions of 5 cm×5 cm were oxidized on the surface by a thermal oxidation at 400° C. in air in an oven from Nabertherm (model HAT 16/17 having a volume of 16 liters) for 1 hour. Two accompanying foils served as underlays.

Example 3

The foil pieces were printed on both sides with 150KA paste (H. C. Starck) to a thickness of about 10 microns using a 200 mesh screen.

The printing parameters are set forth in Table 1.

TABLE 1

| | |
|---|---|
| Mass of printing composition | 0.091-0.093 g |
| Flooding blade | 90 Shore, reciprocating |
| Printing squeegee | Flooding blade |
| Stencil | Screen 200 mesh |
| Blade pressure | 110 N |
| Printing speed | 20 mm/s |
| Snap off | Medium |
| Jump | 0.65 mm |
| Blade travel | 25 mm/210 mm |
| Printing variant | Variable |
| Drying | In convection drying oven, 50° C., 60 min on a tray |
| Paste recirculation | None |

Example 4

Like Example 3, with the difference that the foils were printed on only one side and a mass of printing composition of 0.090-0.097 g was used.

In Examples 1 to 4, the foil pieces were each subsequently heated at a maximum of 1,100° C. under a reduced pressure ($10^{-6}$ bar) for 2 hours (heating profile: 10 K/min to 100° C., 2 h dwell (dwell=hold time), 25 K/min to 450° C., 1 h dwell, 25 K/min to 1,100° C., 2 h dwell). A Ta foil which had a thickness of 50 μm and had neither been oxidized on the surface nor heated under reduced pressure was used as Comparative Example 1.

The results of Comparative Example 1 and Examples 1-4 are set forth in Table 2.

TABLE 2

| | Pretreatment before sintering at 1,100° C. | O content ppm | C content ppm | N content ppm |
|---|---|---|---|---|
| Comparative Example 1 | None | 215 | 61 | 43 |
| Example 1 | Anodized | 1522 | 42 | 41 |
| Example 2 | Thermally oxidized | 1715 | 38 | 39 |
| Example 3 | Printing on both sides | 1760 | 164 | 164 |
| Example 4 | Printing on one side | 993 | 130 | 103 |

After the thermal treatment (corresponding to step b) of the process), both the anodized foils and the oxidized foils lost their color.

The foils of Examples 1 to 4 and that of Comparative Example 1 were subsequently provided with the anode structures by screen printing.

The printing parameters (semi-automatic machine model M2 from the manufacturer EKRA) are set forth in Table 3.

TABLE 3

| | |
|---|---|
| Stencil | 100 microns |
| Squeegee pressure | 110 N |
| Printing speed | 20 mm/s |
| Snap off | Medium |
| Squeegee travel | 35/200 mm |
| Printing variant | No. 3 (TDDT) |
| Drying in convection drying oven | 80° C. - 30 min - tray |
| Paste recirculation | After each 2$^{nd}$ print |

The mass of printing composition in each case was about 0.8 g.

The printed foils were subsequently sintered (sintering program: 10 K/min to 100° C., 2 h dwell, 25 K/min to 450° C., 1 h dwell, 25 K/min to 1,240° C., 2 h dwell) and parted.

The anodes obtained in this way were then assessed for distortion, adhesion and appearance. The anodes from Examples 1 to 4 were not distorted and were otherwise also very well suited for further processing in electronic components. The anodes of Comparative Example 1, on the other hand, were severely distorted and were overall unusable.

While the untreated foil and that treated at only 1,100° C. under reduced pressure are severely arched, in particular at the edge and sometimes between the anodes at the periphery, the foils which were treated according to the present invention display very little peripheral arching and no arching between the anodes at the periphery.

Profiles and x-y regions measured laser-interferometrically by means of a laser scanning instrument from OPM showed sections of 20×20 mm² in the center of the rear sides of the printed foils (up to the edge of the 50×50 mm² foils, the height differences were sometimes >1 mm and were therefore outside the measuring range of the interferometer).

In the case of anodes on untreated Ta foil, the arching in the central 20×20 mm section in the x direction to the edge is 70 µm and diagonally 170 µm. The height difference between the anodes in the center is 20 µm.

The same picture is obtained in the case of anodes on foils which have only been pretreated at 1,100° C. under reduced pressure but not preoxidized.

In the case of anodes on thermally preoxidized foil, the arching in the central 20×20 mm section in the x direction to the edge is <20 µm and diagonally <90 µm. The height difference between the anodes in the center is not more than 7 µm.

In the case of anodes on anodically preoxidized foil, the arching in the central 20×20 mm section in the x direction to the edge is <25 µm and diagonally <60 µm. The height difference between the anodes in the center is not more than 15 µm.

Distortion-free ultra-flat anodes on very thin Ta sheet are provided by the process of the present invention. These are outstandingly suitable for many applications in industry, in particular in the field of portable electronic and microelectronic devices for the commercial and private sectors.

The present invention is not limited to embodiments described herein; reference should be had to the appended claims.

What is claimed is:

1. A process for producing anodes, the process comprising:
providing a foil comprising tantalum or niobium;
oxidizing a surface of the foil so as to form oxides on the foil surface;
heating the foil so that the oxides formed on the foil surface diffuse into the foil;
applying a paste comprising a powder selected from the group consisting of a tantalum powder, a niobium powder, a niobium oxide powder and mixtures thereof to the foil; and
sintering the foil with the applied paste.

2. The process as recited in claim 1, wherein the foil has an average thickness of <100 µm.

3. The process as recited in claim 1, wherein the oxidizing of the foil surface is performed by a process selected from a thermal oxidation, an anodic oxidation, a chemical oxidation, and an application of tantalum (V) oxide or NbO by a printing, a heat treatment, a sputtering, a physical vapor deposition (PVD), and a chemical vapor deposition (CVD).

4. The process as recited in claim 3, wherein the thermal oxidation is performed at a temperature of from 300 to 800° C.

5. The process as recited in claim 4, wherein the thermal oxidation is performed for a time of from <10 to 120 minutes.

6. The process as recited in claim 1, wherein the diffusion of the oxides into the foil surface is performed at a temperature of >600° C.

7. The process as recited in claim 1, wherein the diffusion of the oxides into the foil surface is performed for a time of at least 10 minutes.

8. The process as recited in claim 1, wherein the heating of the foil is performed at a gas pressure of $<10^{-2}$ bar.

9. The process as recited in claim 1, wherein the heating of the foil is performed in an inert gas atmosphere.

10. The process as recited in claim 1, wherein the applying of the paste is performed by a screen printing or a stencil printing.

11. The process as recited in claim 1, wherein the paste comprises a tantalum powder.

12. The process as recited in claim 11, wherein the tantalum powder has a specific capacitance in the range of from 15,000 to 300,000 µFV/g.

13. A process for producing anodes, the process comprising:
providing a foil comprising tantalum with an average thickness of <60 µm;
oxidizing a surface of the foil by a thermal oxidation at from 300 to 800° C. so as to form oxides on the foil surface;
heating the foil at a temperature of from 900 to 1,600° C. and at a pressure of $<10^{-2}$ bar;
applying a paste comprising a tantalum powder to the foil by a stencil printing or a screen printing; and
sintering the foil with the applied paste.

14. The process as recited in claim 13, wherein the paste comprising tantalum powder comprises from 50 to 90 wt.-% of a tantalum powder.

15. The process as recited in claim 13, further comprising separating the anodes to obtain at least one anode.

16. An anode obtainable by the process as recited in claim 15.

17. The anode as recited in claim 16, wherein the anode has a horizontal dimension of from 2 to 10 mm and a vertical dimension of from 25 to 250 microns.

18. A method of using the anode as recited in claim 16 in at least one of a solid-electrolyte capacitor and an electronic component, the process comprising:
providing the anode as recited in claim 16; and
using the anode in at least one of the solid-electrolyte capacitor and the electronic component.

19. The method of using as recited in claim 18, wherein the at least one of a solid-electrolyte capacitor and an electronic component include a capacitor in a portable device.

* * * * *